United States Patent [19]
Ide

[11] Patent Number: 5,417,612
[45] Date of Patent: May 23, 1995

[54] PLUNGING SHAFT COUPLING WHICH PERMITS BOTH PIVOTING AND PLUNGING

[76] Inventor: Russell D. Ide, P.O. Box 744, 641 Arnold Rd., Coventry, R.I. 02816

[21] Appl. No.: 682,525

[22] Filed: Apr. 9, 1991

[51] Int. Cl.⁶ .............................................. F16D 3/20
[52] U.S. Cl. ...................................... 464/120; 464/905
[58] Field of Search ............... 464/120, 122, 123, 124, 464/132, 136, 905, 112

[56] References Cited

U.S. PATENT DOCUMENTS

| | | | |
|---|---|---|---|
| 849,384 | 4/1907 | Gault | 464/120 |
| 919,651 | 4/1909 | Spicer | 464/122 |
| 952,413 | 3/1910 | Breed | 464/122 |
| 991,807 | 5/1911 | Spade | 464/132 X |
| 999,831 | 8/1911 | Merten | 464/122 |
| 2,559,108 | 7/1951 | Boge, Sr. et al. | 464/122 |
| 2,914,930 | 12/1959 | Wildhaber | 464/123 |
| 3,062,024 | 11/1962 | Bania | 464/120 |
| 3,098,365 | 7/1963 | Pearson | 464/120 |
| 3,609,994 | 10/1971 | Colletti et al. | 464/122 X |
| 3,975,922 | 8/1976 | Orain | 464/123 |
| 4,192,154 | 3/1980 | Nakamura et al. | 464/111 |

FOREIGN PATENT DOCUMENTS

| | | | |
|---|---|---|---|
| 581285 | 11/1924 | France | 464/124 |
| 67512 | 3/1958 | France | 464/120 |
| 458006 | 12/1936 | United Kingdom | 464/120 |
| 1057305 | 2/1967 | United Kingdom | |

*Primary Examiner*—Daniel P. Stodola
*Attorney, Agent, or Firm*—Michael D. Bednarek; Marks & Murase

[57] ABSTRACT

A coupling for connecting two shafts to each other. The coupling allows one shaft to pivot about transverse axes and plunge toward and away from the other shaft. The coupling is well suited for use as the inboard plunging unit of a constant velocity joint for a front wheel drive vehicle. The shaft end is received in a splined opening formed in a trunnion. The trunnion is pivotably supported in a trunnion support body. The trunnion support body is in turn pivotably supported in slider blocks and the slider blocks are slidable within a drive canister or can. The sliding surfaces preferably include bearings formed of a high PV plastic material such as VESPEL ™.

18 Claims, 7 Drawing Sheets

PLUNGING SHAFT COUPLING WHICH PERMITS BOTH PIVOTING AND PLUNGING

FIELD OF THE INVENTION

The present invention relates to a coupling for use in a constant velocity joint for connecting two shafts so that rotation of one shaft about its own axis results in rotation of the other shaft about its axis. The present invention is particularly directed to a coupling for use as the inboard plunging joint of a constant velocity joint used in a front wheel drive of a motor vehicle.

BACKGROUND OF THE INVENTION

Constant velocity joints connect shafts such that the speeds of the shafts connected by the joint are absolutely equal at every instant throughout each revolution. This distinguishes constant velocity joints from simple universal joints. Specifically, if one of the shafts connected by a universal joint is revolving at an absolutely constant speed, then the other shaft will revolve at a speed that is, during two parts of each revolution, slightly greater and, during the other two parts of the revolution, slightly less than the constant speed of the first shaft. The magnitude of this fluctuation in speed increases as the angle between the axes of the two shafts increases. This disadvantage becomes of practical importance in applications requiring constant velocity such as front wheel driven vehicles and in the drives to independently sprung wheels where the angles between the shafts may be as large as 40°.

It is known that the speed variation problem can be solved by using two universal joints in series. If the joints are properly arranged, the irregularity introduced by one joint will be cancelled out by the equal and opposite irregularity introduced by the second joint. Constant velocity joints include such double universal joints as well as any joint in which the speeds of the shafts connected by the joint are absolutely equal at every instant throughout each revolution. Typically a constant velocity joint includes a shaft with a universal-type coupling at each end. This arrangement is sometimes referred to as a constant velocity shaft.

In a front wheel drive vehicle, constant velocity drive shafts are always used in pairs. One shaft is located on the left (driver) side of the vehicle and the other is placed on the right (passenger) side. Each shaft has an inboard or plunge coupling that connects the constant velocity shaft to the engine/transaxle and an outboard or fixed coupling that connects the shaft to a left or right wheel. The inboard and outboard couplings and shaft together comprise a constant velocity joint or drive shaft which couples the engine/transaxle shaft to the wheel shaft. In operation, the outboard coupling turns with the wheel around a "fixed" center, while the inboard coupling "telescopes" or plunges and turns at an angle sufficient to allow required movement of the car's suspension system.

Each coupling must be capable of pivoting at least about two transverse axes to the extent required by the specific application. For example, a compact constant velocity joint that provides power to the wheels typically must operate at angles of 40° or more to meet the car's requirements for steering and suspension movements. Thus, each end of the joint must be able to move at least 20°.

Various constant velocity joints have been developed for use in motor vehicles. These include the Tracta joint manufactured in England by Bendix Limited, the so called Weiss joint manufactured in America by Bendix Products Corporation and a joint developed by Birfield Transmissions Limited. Today, there are two basic outboard joint designs and three basic inboard joint designs commonly in use.

The two basic outboard front wheel drive couplings are the Rzeppa and the fixed tripod design. The Rzeppa design includes a cage, inner and outer races and a matched set of six balls guided by the cage. The fixed tripod design includes a three legged cross or trunnion fixed in a housing, a shaft end having a tulip shape, and tracks of circular cross-section to match the rollers.

The three basic types of inboard front wheel drive couplings are the cross groove design, the double offset design and the tripod-plunge design. The cross groove design includes a cage, angled inner and outer races, and a matched set of six balls, guided by the cage for movement in the races. The double offset design is similar to the Rzeppa design and includes a cage, inner and outer races having grooves formed therein, and six balls guided by the cage. The tripod plunge design includes a three legged cross or trunnion and a bearing assembly fixed in place on a splined shaft. The assembly slides in a grooved tulip shaped housing.

One of the basic requirements of the inboard plunging joint or coupling is that it must be able to transmit torque into the wheel axle. The previously mentioned inboard plunging couplings have performed satisfactorily in small cars with relatively low torque engines. However, such couplings have not performed well when applied to larger cars with higher torque engines. Accordingly, there have been attempts to increase the torque carrying capacity of known inboard plunging joints.

Figure 1:
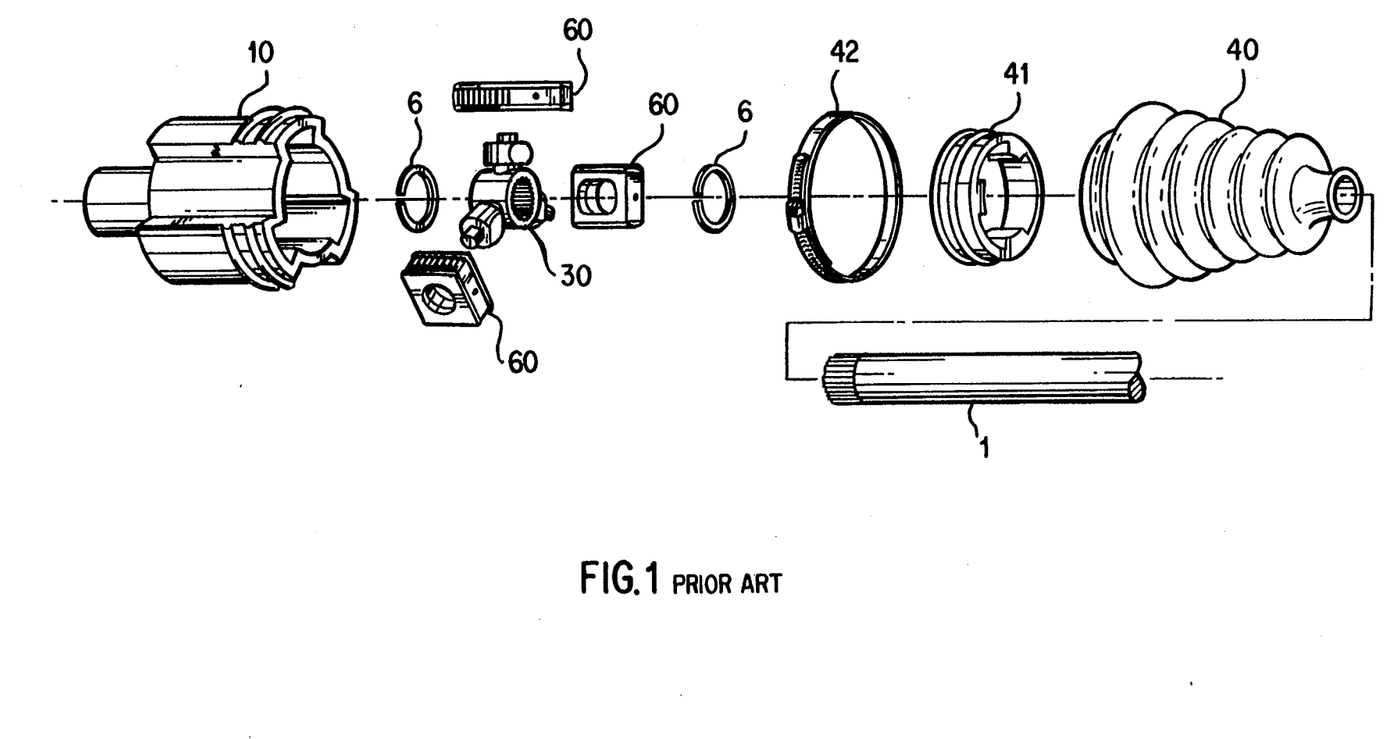
FIG. 1 is an exploded prospective view of a known S-type constant velocity joint coupling.
Figure 1A:
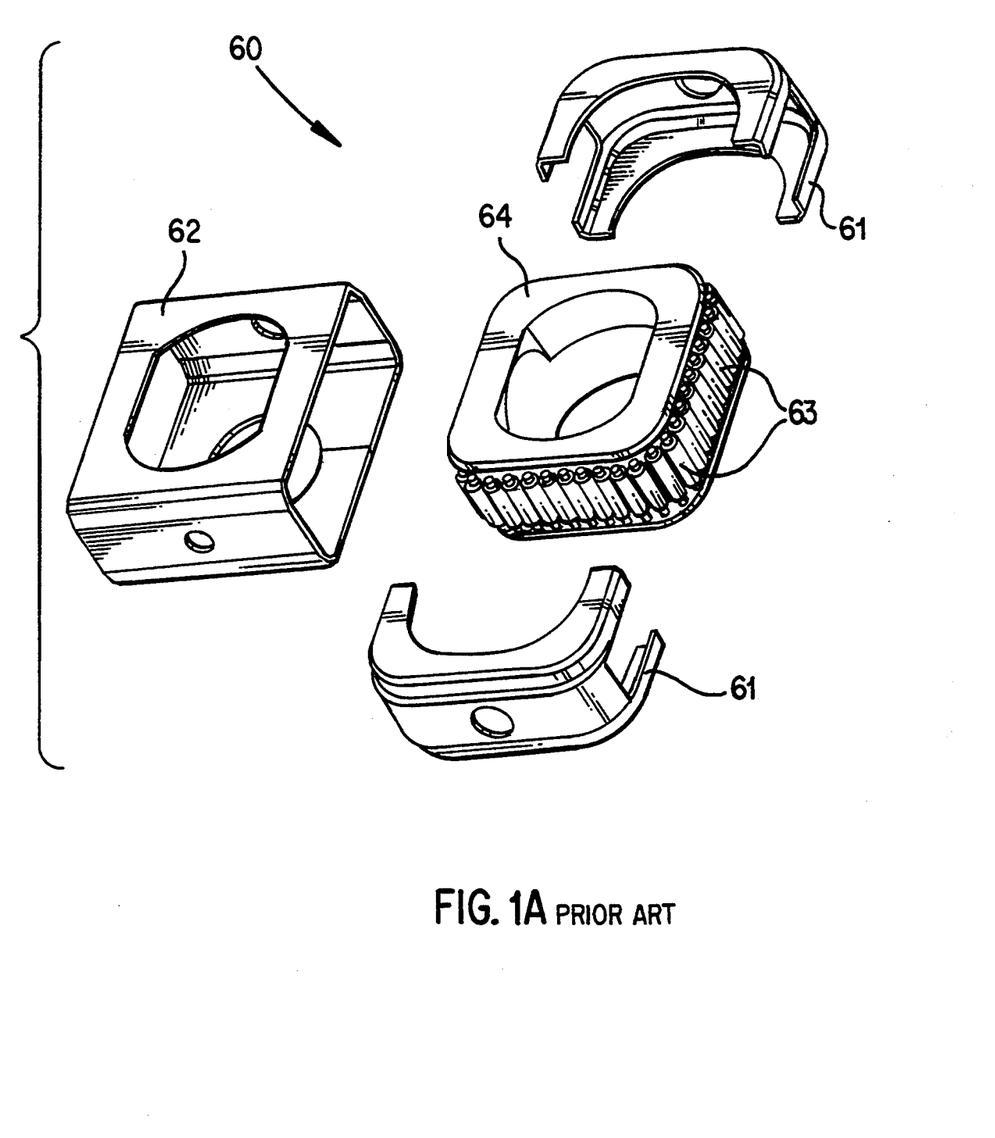
FIG. 1A is an exploded prospective view of the bearing assembly used in the S-type joint coupling of FIG. 1.

One inboard plunging Joint: designed by General Motors to minimize ride disturbance induced by high angulation under high torque, known as "shudder", is shown in FIGS. 1 and 1A. This joint is called the S-plan joint and is said to provide shudderless operation.

As shown in FIG. 1, the S-plan joint is a modified version of the tripod plunge design inboard joint. The S-plan joint typically includes a drive canister or housing 10 having axial grooves formed therein, a trunnion 30' having a splined shaft receiving opening and three legs, a bearing assembly 60 supporting each leg in an axial groove and a flexible boot assembly including a boot 40, sealing ring 41 and clamp 42 for sealing the interior of the joint. Snap rings 6 are provided to retain an engine/transaxle shaft 1 in the splined opening of the trunnion 30'. The principal difference between the S-plan joint and a conventional tripod plunge design PV joint is that the bearing assemblies 60 of the S-plan joint are square so that the torque transmitting surface area is increased significantly. The increased torque carrying capacity of this joint eliminates angulation under high torque (shudder).

The principal disadvantage of the S-plan joint is that the square bearing assemblies 60 responsible for the improved torque capacity results are very intricate and expensive. As best shown in FIG. 1A, each square bearing assembly 60 includes an outer housing 62, outer races 61 and inner races 64 and a series of tiny needle bearings 63 between the outer race 61 and inner race 64. This complex multi-part structure is quite expensive both in terms of cost of the parts and assembly time.

This expense is significant since each vehicle requires six such bearing assemblies.

Thus, there is a need for an inexpensive, easily assembled inboard plunging coupling capable of transmitting high torque.

The present invention also relates to the use of bearing sleeves instead of rolling element bearings.

This application relates, in part, to the use of sleeve bearings which can be used instead of expensive ball bearings. The principal limitation in a sleeve bearing's performance is the so-called PV limit. For instance, high edge loading causes a sleeve bearing to reach its PV limit. PV is the product of load or pressure (P) and sliding velocity (V). A sleeve bearing subjected to increasing PV loading will eventually reach a point of failure known as the PV limit. The failure point is usually manifested by an abrupt increase in the wear rate of the bearing material.

As long as the mechanical strength of the bearing material is not exceeded, the temperature of the bearing surface is generally the most important factor in determining PV limit. Therefore, anything that affects surface temperature—coefficient of friction, thermal conductivity, lubrication, ambient temperature, running clearance, hardness and surface finish of mating materials—will also affect the PV limit of the bearing.

Thus, the first step in selecting and evaluating a sleeve bearing is determining the PV limit required by the intended application. It is usually prudent to allow a generous safety margin in determining PV limits, because real operating conditions often are more rigorous than experimental conditions.

Determining the PV requirements of any application is a three step process. First, the static loading per unit area (P) that the bearing must withstand in operation must be determined. For journal bearing configurations, the calculation is as follows:

$$P = W/(d \times b)$$

P = pressure, psi (kg/cm$^2$)
W = static load, lb (kg)
d = bearing surface ID, in. (cm)
b = bearing length, in. (cm)

Pressure (P) should not exceed certain maximum values at room temperature. These can be derived from a table of allowable static bearing pressure for most known materials. Next, the velocity (V) of the bearing relative to the mating surface must be calculated. For a journal bearing experiencing continuous rotation, as opposed to oscillatory motion, velocity is calculated as follows:

$$V = (dN)$$

where:
V = surface velocity, in/rain (cm/min)
N = speed of rotation, rpm of cycles/min
d = bearing surface ID, in. (cm)

Finally, calculate PV as follows:

$$PV(psi-ft/min) = P(psi) \times V(in/min)12$$

or, in metric units:

$$PV(kg/cm^2 - m/sec) = P(kg/cm^2) \times V(cm/min)/6000$$

The PV limits of unlubricated bearing materials are generally available from the manufacturer of the material or from technical literature. Since PV limits for any material vary with different combinations of pressure and velocity as well as with other test conditions, it is prudent to consult the manufacturer for detailed information.

One material which is particularly well suited to bearing applications is the polyimide thermoset material sold by Dupont under the trademark VESPEL TM. Properly lubricated VESPEL TM parts can withstand approximately 1 million psi-ft/min.

SUMMARY OF THE INVENTION

The present invention obviates the problems experienced with prior designs by providing a high torque plunging coupling which is much less expensive than the S-Plan-type coupling. Accordingly, it is expected that results equal to or better than the S-plan joint or coupling can be achieved at much lower cost. The coupling is useful in any environment requiring a plunging coupling, but is believed particularly useful as the inboard plunging coupling in a front wheel drive vehicle.

The coupling of the present invention includes a drive canister, a trunnion and a trunnion support member. The drive canister includes a housing having a plurality of axial grooves formed therein. (The grooves preferably include planar surfaces). If desired, these grooves may include linings or coatings of a low friction, high PV plastic material such as VESPEL TM. The grooves are arranged in the drive canister so as to provide a cruciform-shaped opening extending axially inward from one end of the drive cannister to define an open end. The open end of the drive canister is adapted to receive the trunnion and trunnion support member for plunging movement in the axial grooves. The drive canister may have either a male spline or female spline end cap at the other end thereof.

The trunnion comprises a substantially cylindrical body and spherical ends. The cylindrical body has bearing surfaces at its distal ends and a central cylindrical portion having a splined bore formed therein. The splined bore has an axis which is transverse to the longitudinal axis of the cylindrical body. Preferably, the bearings are simple cylindrical sleeves formed of a plastic material such as VESPEL TM having a high PV. Alternatively, rolling element bearings can also be used, but this increases cost and complexity.

The trunnion support member comprises a body having a cross-sectional shape substantially complimentary to the shape of the open end of the drive canister so that the trunnion support member can slide axially within the axial grooves in the drive canister. The trunnion support member comprises a central body portion, a pair of coaxial cylindrical stub portions extending from opposite sides of the central body portion, and a pair of slider bearing blocks mounted on the cylindrical stub portions of the trunnion support member.

The slider bearing blocks have cylindrical openings formed therein so that the blocks can be mounted on the cylindrical stub portions of the trunnion support member. The blocks also have outer surfaces which are complimentary to grooves formed in the drive canister such that the outer portion of the slider bearing blocks are slidable along the axial grooves formed in the drive canister.

Preferably, the outer surfaces are planar so as to slide along corresponding planar surfaces of the axial grooves. The planar contact of the slider block with the planar surface of the groove allows such sliding but precludes rotation of the slider block in the grooves. The cylindrical stub portions are pivotable with respect to the slider bearing block to allow pivoting of the trunnion support member within the drive canister about the axis of the cylindrical stub portion.

The central body portion of the trunnion support member includes a cylindrical trunnion receiving bore having an axis which is transverse to the axis of the cylindrical stub portions. The central body portion further includes an elongated opening shaped to allow swinging motion of a shaft supported in the splined opening of the trunnion in the plane of the axis of the cylindrical stubs but a point located on the axis of the trunnion receiving bore. In this way, the elongated opening acts as a cylindrical bore with a range of axes all of which are coplanar with the axes of the cylindrical stubs and transverse to the axis of the trunnion receiving bore. This elongated opening allows the splined receiving opening to remain uncovered during a predetermined angular motion of about 25 degrees. It follows that a shaft received in this opening has a freedom of movement of about 25 degrees in each direction for a total of roughly 50 degrees.

Preferably, bearings are provided at each surface where there is movement, i.e., rotation or sliding movement. The most suitable such bearing appears to be simple sleeves or lining of a plastic material having a low coefficient of friction and a high PV. Of course, other bearings such as rolling element bearings could be provided, but that would increase cost and complexity.

In the assembled state, the splined opening of the trunnion receives a shaft end. The shaft end extends through the elongated opening formed in the trunnion support member. The elongated opening allows the shaft to pivot with the trunnion about the axis of the trunnion to the degree permitted by the elongated opening. Preferably the range of pivoting between the edges of the elongated opening is about 25 degrees in each direction for a total of 50 degrees. The shaft is also pivotable with the trunnion support member about the axes of the cylindrical stub. In this case, the pivoting movement occurs between the cylindrical stub and the cylindrical bores of the slider blocks. Finally, the shaft can plunge axially with the slider bearing blocks relative to the drive canister. In this case, the motion is between the outer surfaces, preferably planar, of the sliding bearing blocks and the axial grooves formed in the drive canister. Thus, collectively, the coupling allows pivoting about transverse axes and plunging relative to the drive canister. This satisfies the requirements of an inboard plunging coupling used in a CV joint in a front wheel drive vehicle. Of course, the coupling may have other applications for which it is well suited. Finally, since the coupling is constructed of relatively few components, it can be inexpensively produced on a large scale.

DETAILED DESCRIPTION OF THE INVENTION

Figure 2:
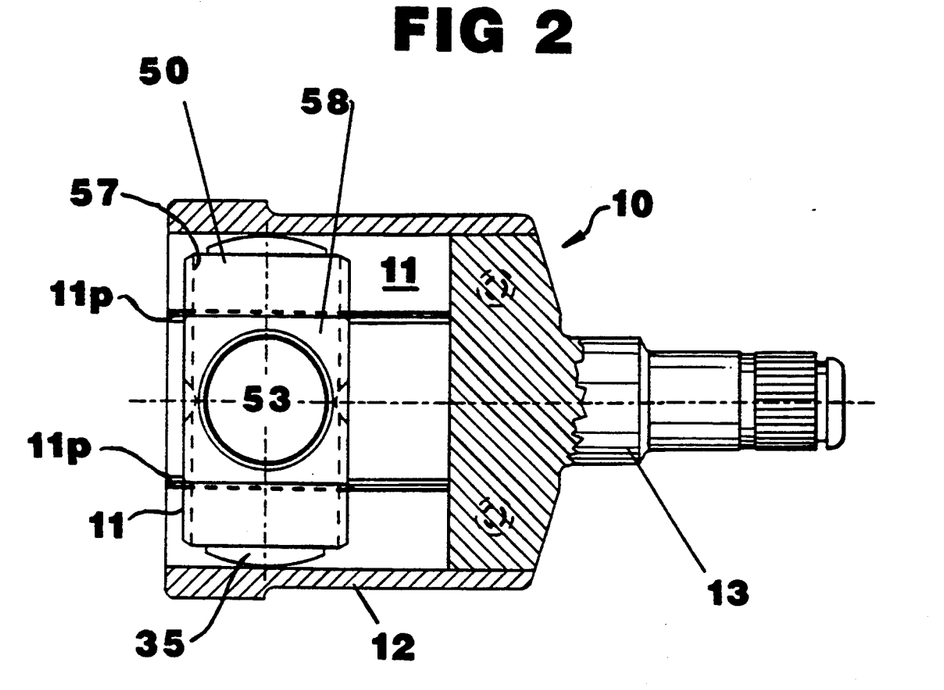
FIG. 2 is a side view, partially in section, of the coupling of the present invention.
Figure 2A:
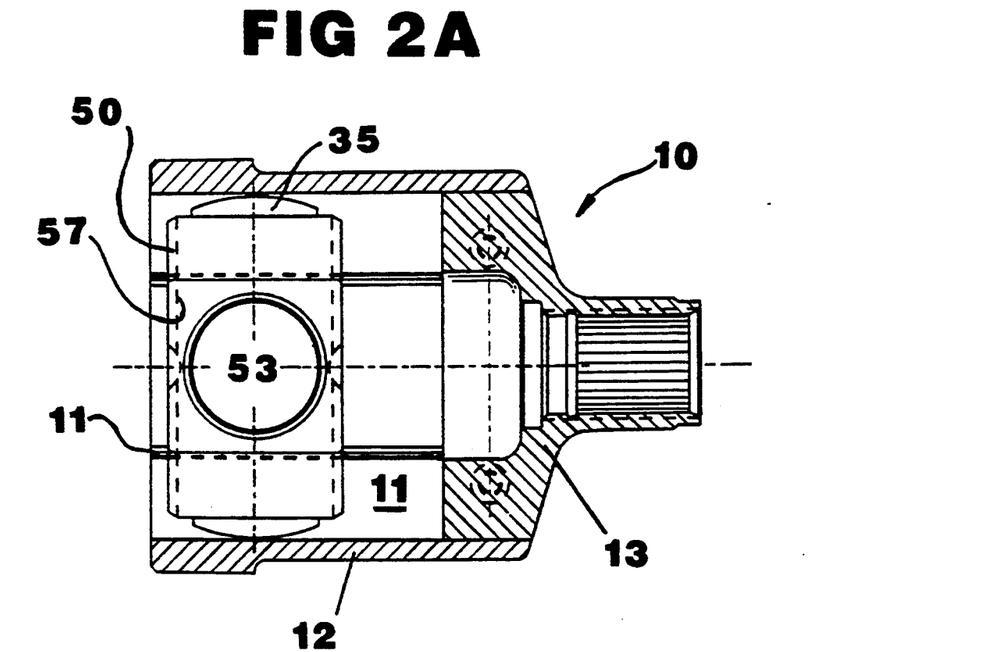
FIG. 2A is a side sectional view of a coupling according to the present invention similar to that of FIG. 2 except that the end cap has a female spline.
Figure 3:
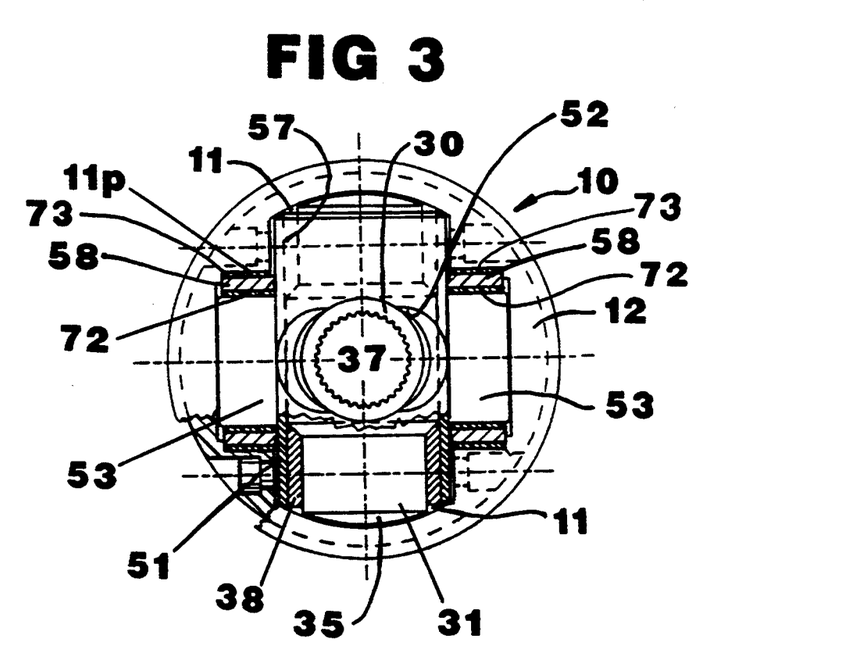
FIG. 3 is an end view, partially in section, of the coupling of FIG. 2.
Figure 3A:
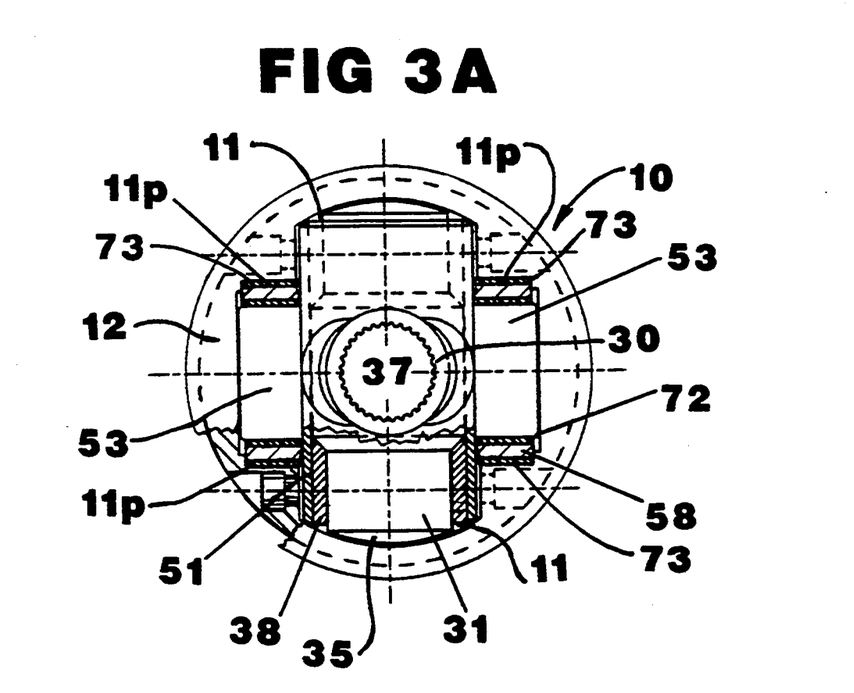
FIG. 3A is an end view, partially in section, of the coupling of FIG. 2A.

FIGS. 2, 2A, 3 and 3A illustrate the coupling of the present invention in an assembled state. The coupling of FIGS. 2 and 3 and the coupling of FIGS. 2A and 3A are identical except that the end cap 13 of the coupling in FIGS. 2A and 3A is formed with a female spline, whereas the end cap 13 of the coupling of FIGS. 2 and 3 is formed with a male spline. The couplings are in all other respects identical and are discussed hereinafter together.

Figure 7:
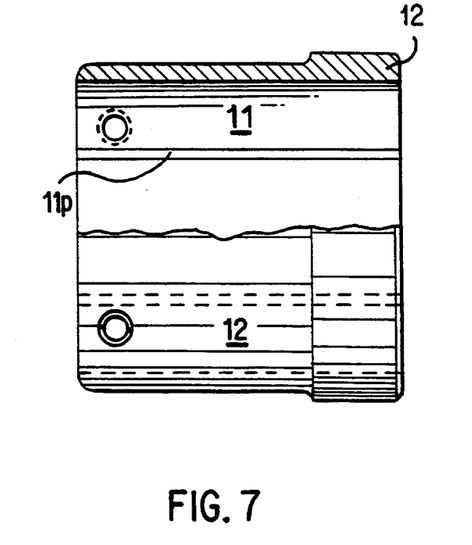
FIG. 7 is a side view, partially in section, of the housing of a drive canister for use in the coupling of the present invention.
Figure 7A:
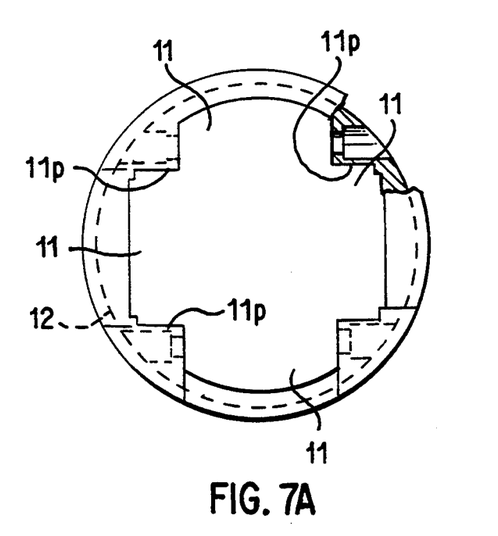
FIG. 7A is an end view, partially in section, of the drive canister housing of FIG. 7.

As shown in the side views of FIGS. 2 and 2A, the coupling includes a drive canister or can 10 having an outer housing or shell 12 which, as best shown in FIGS. 7 and 7A, has two open ends. One end of the housing 12 is closed by an end cap 13. The end cap 13 is formed with a shaft connection in the form of a spline which may be either a male spline (FIG. 2) or a female spline (FIG. 2A). The drive canister 10 is formed with a plurality of axial grooves 11. In the illustrated embodiment, one pair of opposed axial grooves 11 have planar faces 11p. Preferably, the planar faces 11p include linings of a plastic material such as VESPEL™, having a low coefficient of sliding friction. The grooves may, as shown in FIG. 7A, define a cruciform shaped opening in the end of the canister outer housing or shell 12.

Figure 4:
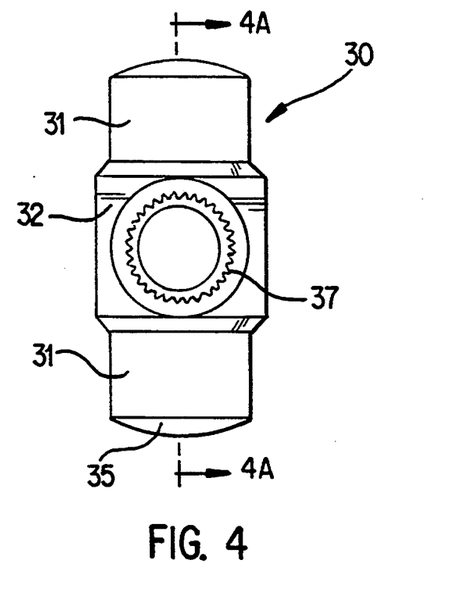
FIG. 4 is a side view of a trunnion used in the coupling of the present invention.
Figure 4A:
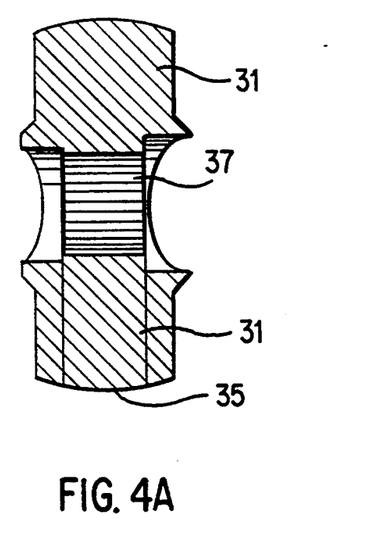
FIG. 4A is a cross-sectional view, along the lines indicated in FIG. 4, of the trunnion of FIG. 4.

The coupling also includes a trunnion 30 of the type depicted separately in FIGS. 4 and 4A. The trunnion has a cylindrical body and rounded ends 35 which can be seen in FIGS. 2 and 2A. The cylindrical body of the trunnion includes a central cylindrical body portion and sleeve bearings at its distal ends. The trunnion 30 has a splined opening 37 formed in the central cylindrical body portion. As best seen in FIGS. 3 and 3A, the splined opening 37 is accessible through an elongated opening formed in the trunnion support member discussed below.

The trunnion 30 is received in a cylindrical bore 57 in the trunnion support member 50, the components of which are depicted in FIGS. 5, 5A, 5B, 6, 6A, 10, 10A and 10B. The trunnion support member includes cylindrical stubs 53 mounted in slider bearing blocks 58 and a central body part 51 having a trunnion receiving bore formed therein. As best shown in FIGS. 3 and 3A, the trunnion support member 50 has an elongated opening 52 formed therein such that the portion of the trunnion in which the splined opening 37 is formed is accessible when the trunnion is turned through a predetermined angular range.

In operation, the splined shaft receiving opening 37 formed in the trunnion receives the end of a shaft of the type shown in FIG. 1. A shaft so supported can pivot with the trunnion 30 about the longitudinal axis of the trunnion through the range of movement permitted by the elongated opening 52. Further, the shaft and trunnion can pivot with the trunnion support member about the axis of the cylindrical stubs 53 and the shaft, trunnion, and trunnion support member can slide with the slider bearing blocks 58 in the axial grooves 11 formed in the drive can or canister 10. Thus, a shaft received in the splined opening 37 in the trunnion can pivot about transverse axes and plunge relative to the drive canister or can as required for the inboard plunging joint of a constant velocity joint using a front wheel drive vehicle.

Moreover, because of the planar contact between the slider bearing block 58 and the axial grooves 11, this particular coupling has a very high torque capability. All of these advantageous operational results are achieved with a structure which has very few parts and in which the parts are relatively simple and easy to assemble. Thus, this coupling can be manufactured at a much lower cost than known couplings having similar capabilities.

To enable a better understanding of the components of the present invention, a number of the important components will be discussed hereinafter with specific reference to FIGS. 4–10B.

FIGS. 4 and 4A and 9 and 9A show the details of the components of the trunnion 30 of the present invention. Specifically, as shown in FIGS. 4 and 4A, the trunnion body includes a central portion 32 having a splined bore 37 formed therein. The ends 35 of the trunnion are spherically shaped to facilitate the required pivoting motion of the trunnion support member 50 as discussed above. The distal ends of the cylindrical portion of the trunnion 31 have a reduced diameter so as to allow a bearing, preferably a sleeve bearing, to be mounted on these distal ends 31.

Figure 9:
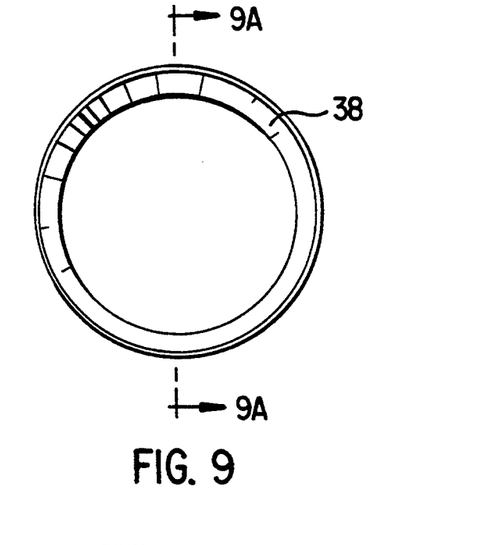
FIG. 9 is a sleeve bearing adapted to be mounted on the distal ends of the trunnion of the coupling of the present invention.
Figure 9A:
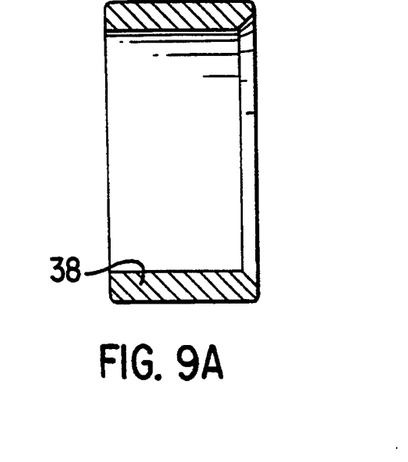
FIG. 9A is a cross-section of the sleeve bearing of FIG. 9 along the lines indicated in FIG. 9.

The construction of the sleeve bearings 38 provided on the distal ends of the trunnion 30 is shown in FIGS. 9 and 9A. As shown, the bearing is preferably a simple sleeve of a plastic material such as VESPEL TM having a low coefficient of sliding friction and a high PV. Naturally, if desired, rolling element bearings could be used instead, but this would dramatically increase the cost at assembly time involved in manufacturing the coupling.

Figure 5:
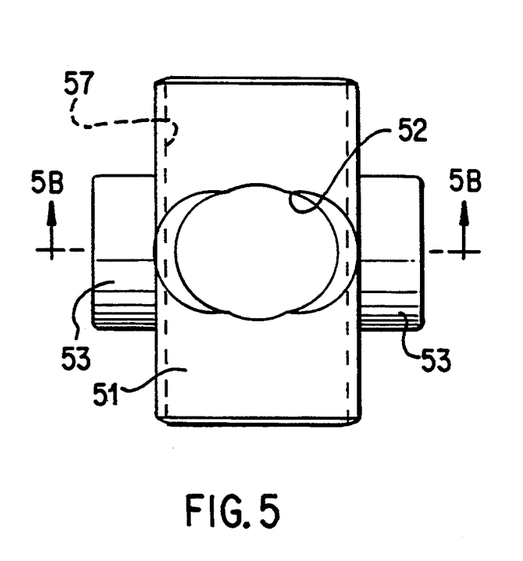
FIG. 5 is a front view of the body of the trunnion support member used in the coupling of the present invention.
Figure 5A:
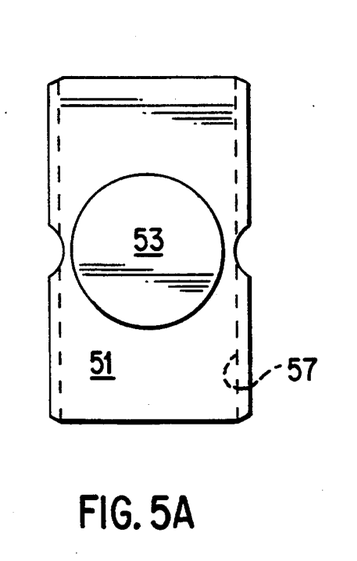
FIG. 5A is a side view of the trunnion support member body of FIG. 5.
Figure 5B:
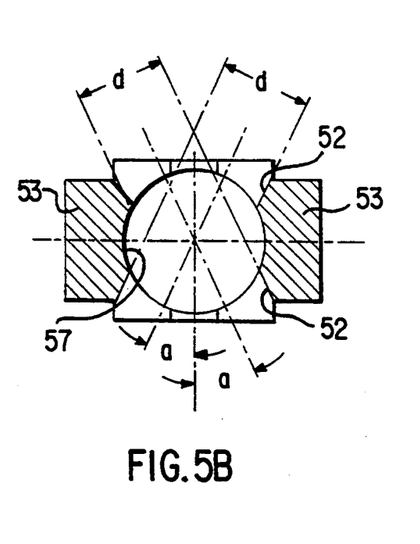
FIG. 5B is a cross-section along the lines indicated in FIG. 5 of the trunnion support body of FIG. 5.
Figure 10:
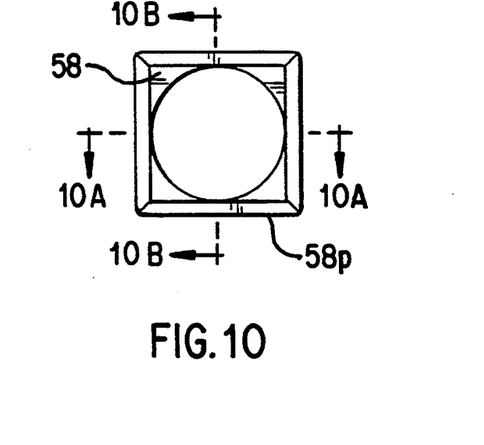
FIG. 10 is a front view of a square slider bearing block adapted to be mounted on the cylindrical stubs of the trunnion support member of FIGS. 5-5B.
Figure 10A:
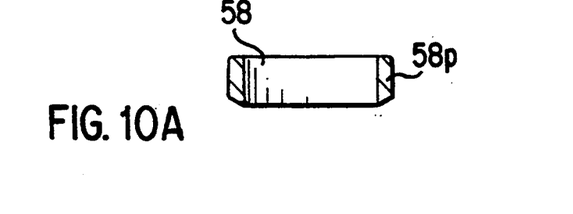
FIG. 10A is a cross-section of the slider bearing block of FIG. 10, along the lines indicated in FIG. 10.
Figure 10B:
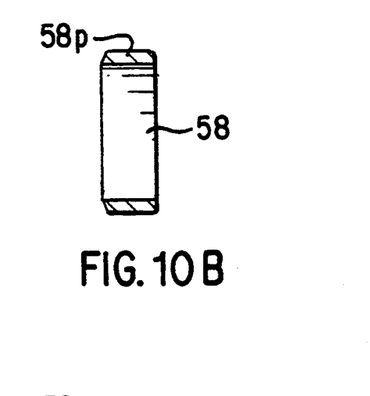
FIG. 10B is a cross-section of the slider bearing block of FIG. 10, along the lines indicated in FIG. 10.

The configuration of the trunnion support member 50 is shown in FIGS. 5, 5A and 5B and in FIGS. 10, 10A and 10B. As shown in FIGS. 5, 5A and 5B, the trunnion supporting member 50 includes a body portion 51 having a trunnion receiving bore 58 formed therethrough. The trunnion receiving bore 58 is preferably cylindrical. The trunnion supporting member 50 further includes a pair of coaxial cylindrical stub portions 53 extending from the opposite sides of the body 51. An elongated opening 52 is formed in the body 51. The shape of the opening 52 is preferably constructed as the projection of a shaft which pivots about the axis of the trunnion receiving bore on a plane transverse to the axis of the trunnion receiving bore, which plane includes the axis of the cylindrical stub portions 53. In this way, the opening is shaped to permit angular movement of a shaft received in the shaft receiving opening 37 of the trunnion 30 for a predetermined angular movement (a) in either direction from the central direction for a shaft having diameter (d). In order to meet the requirements of a constant velocity joint for use in a front wheel drive vehicle, the range of movement should be about 50° of total motion (25' in either direction). The range of angular motions (a) is best depicted in FIG. 5B.

As explained previously, a slider bearing block 58 is supported on each of the cylindrical stub portions 53. The construction of the slider bearing block is best shown in FIGS. 10, 10A and 10B. As shown therein, the slider bearing block 58 has a rectangular, preferably square, outer shape. The outer periphery includes planar surfaces 58p complimentary to the planar surfaces 11p of the axial grooves 11 formed in the drive canister 10 so that the outer surfaces 58p of the slider bearing block 58 can slide within the axial grooves 11. The slider bearing block 58 further includes a cylindrical bore formed therein to receive the cylindrical stub portion 53. The cylindrical stub portions 53 are supported in the cylindrical bore such that both the trunnion support member 53 and the trunnion 30 are pivotable relative to the slider bearing block 58. To facilitate such pivoting, a bearing sleeve is mounted between the cylindrical stub portion 53 and the cylindrical bore of the slider bearing block 58. Again, the preferred form of bearing is a sleeve of high PV plastic material such as VESPEL TM.

Figure 6:
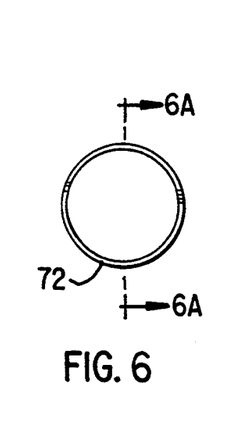
FIG. 6 is a front view of a sleeve bearing adapted to be mounted on the cylindrical stubs of the trunnion support member of FIG. 5.
Figure 6A:
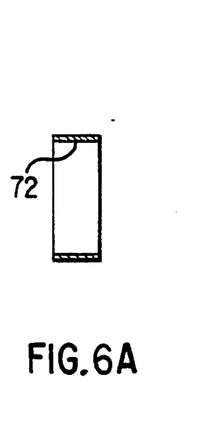
FIG. 6A is a cross-section along the lines indicated in FIG. 6 of the sleeve bearing of FIG. 6.

An example of a suitable sleeve bearing is shown in FIGS. 6 and 6A. As shown therein, the sleeve bearing is a simple ring 72 of a high PV plastic material such as VESPEL TM. The ring is preferably secured by an adhesive or the like to either the cylindrical stub 53 or the cylindrical bore formed in the slider bearing block 58. Generally, it is better to secure the bearing ring 72 to the cylindrical stub 53 since this increases the sliding surface area (the outer surface of the bearing ring has a slightly greater surface area than the inner surface).

Finally, the construction of the housing or shell portion 12 of the drive canister 10 is shown in FIGS. 7 and 7A. As shown in these figures, the shell 12 has a generally cylindrical outer peripheral shape and is formed with axial grooves 11 as best shown in FIG. 7A. The axial grooves define a generally cruciform opening in the end of the drive canister in which the assembled trunnion and trunnion support member fit. The axial grooves 11 on which the slider bearing blocks 58 slide are planar so that planar contact is established between the slider bearing blocks 38 and the axial grooves 11. Such planar contact enables a great deal of torque to be transmitted between the two members. This contributes to the high torque capacity of this coupling. Moreover, the contact of these planar surfaces prevents rotation of the slider block 58 in the groove 11.

Figure 8:
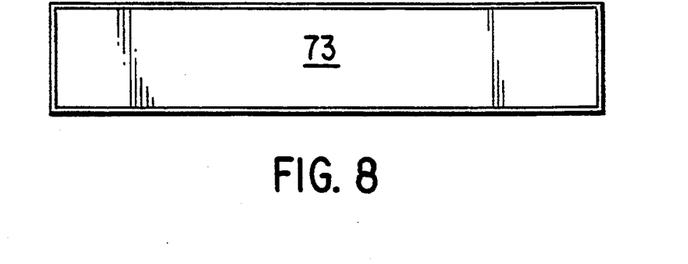
FIG. 8 is a top view of an adapter insert mounted in the grooves of the drive canister of the coupling of the present invention.

To facilitate sliding between the slider bearing block 58 and the axial grooves 11 of the drive canister 10, a bearing is provided between the sliding surfaces. Again, a rolling element bearing could be used, but this is complicated and expensive. Instead, it is preferable to provide a layer or a sleeve of high PV plastic material between the sliding surfaces. Thus, a sleeve or insert 73 of high PV plastic material is preferably mounted on the planar surfaces of the axial grooves 11 of the drive canister on which the slider bearing blocks 58 slide. An example of such a sleeve or layer of high PV material is shown in FIG. 8.

From the foregoing description, it should be apparent how the coupling of the present invention satisfies the operational requirements for a coupling used as an inboard plunging coupling of a front wheel drive vehicle constant velocity joint. Specifically, as previously noted, the requirements of such a coupling are a limited amount of pivoting about two transverse axes and a limited degree of plunging motion in the direction which is transverse to both of the axes about which pivoting occurs. In the case of the coupling of the present invention, the shaft receiving opening 37 of the trunnion 30 can receive a shaft. Once the shaft is received in the opening 37 it is pivotable about the axis of the trunnion 30 and also pivotable about the axis of the cylindrical stubs 53. Further, the shaft can be plunged axially relative to the drive canister 10. In this way, the present invention provides a simple and inexpensive high torque coupling suitable for use as the inboard plunging unit of a constant velocity joint of a front wheel drive vehicle and in other applications where similar motion is required.

I claim:

1. A coupling, the coupling comprising:
   a drive canister;
   a trunnion; and
   a trunnion support member;
   the drive canister comprising a housing having a plurality of axial grooves formed therein, the drive canister having a predetermined axial cross-section;
   the trunnion comprising a cylindrical body and opposed spherical ends, the cylindrical body including a central cylindrical portion and cylindrical bearing end portions, the cylindrical body having a longitudinal axis and a splined bore formed therein, the splined bore having an axis which is transverse to the longitudinal axis of the cylindrical body;
   the trunnion support member comprising a body having a cross-sectional shape substantially complimentary to the cross-sectional shape of axial grooves formed in the drive canister so that the trunnion support member can slide axially within the drive canister; the trunnion support member further comprising a central body portion and a pair of coaxial cylindrical stub portions extending from opposite sides of the central body portion, the trunnion support member further comprising a slider bearing block mounted on each of the cylindrical stub portions, the slider bearing block including an outer surface having planar portions adapted to slide in the axial grooves formed in the drive canister and a cylindrical opening in which the cylindrical stub portions are received to allow pivoting of the cylindrical stub portions and the body member about the axis of the cylindrical stub portions, the central body portion of the trunnion support member comprising a cylindrical trunnion receiving bore having an axis which is transverse to the axis of the cylindrical stub portions and an elongated opening having a predetermined shape, the opening allowing the splined receiving opening to remain uncovered during a predetermined angular motion;
   whereby the trunnion is adapted to receive a shaft end, said shaft end extending through the elongated opening and being pivotable with said trunnion about the axis of said trunnion, said shaft being further pivotable with said trunnion support member about the axis of the cylindrical stubs and said shaft being adapted to plunge axially with the slider bearing blocks relative to the drive canister.

2. The coupling of claim 1, wherein bearings are provided between each pair of sliding surfaces.

3. The coupling of claim 2, wherein the bearings comprise plastic sleeve bearings.

4. The coupling of claim 1, wherein the trunnion has cylindrical bearing portions at the distal ends of the cylindrical portion.

5. A coupling for connecting a first shaft to a second shaft for pivoting about transverse axes and plunging relative to one another, the coupling comprising:
   a drive canister, the drive canister having first and second opposed axial ends, a shaft connector formed at the first end of the drive canister for securing the first end of the drive canister to the first shaft, a plurality of axial grooves extending axially inward from the second end of the drive canister, each axial groove having opposed planar surfaces;
   a trunnion, the trunnion having opposed spherical ends and a cylindrical body extending between the spherical ends, a shaft connector provided on the cylindrical body equidistant from the opposed cylindrical ends, the shaft connector allowing the securement of the second shaft to the trunnion;
   a trunnion support body, the trunnion support body comprising a cylindrical trunnion receiving bore formed therein and a pair of colinear cylindrical stubs extending from opposite sides of the body, the trunnion receiving bore having an axis which is transverse to the axis of the colinear cylindrical stubs, the trunnion being pivotably received within the trunnion receiving bore for pivoting about the axis of the trunnion receiving bore, the trunnion support body further comprising an elongated opening through which one of the second shaft and the shaft connector extends for pivoting movement with the trunnion; and
   two slider blocks, each slider block having a cylindrical bore formed therein and a non-cylindrical outer periphery which includes opposed planar surfaces, each slider block being mounted on one of the cylindrical stubs of the trunnion support body such that the trunnion support member is pivotable with respect to the slider blocks about the axis of the cylindrical stubs, the slider blocks being slidably received in axial grooves of the drive canister for sliding of one of the planar faces of the slider block against one of the planar faces of the axial grooves, the slider blocks being locked against rotation in these grooves by the contact of the planar face of the slider blocks with the planar face of the grooves;

whereby the second shaft is mounted for simultaneous pivoting about the axis of the trunnion receiving bore, pivoting about the axis of the cylindrical stubs and sliding in the direction of the axial grooves.

6. The coupling of claim 5, wherein the cylindrical body of the trunnion includes sleeve bearings at each axial end of the body to support the trunnion for pivoting within the trunnion support body.

7. The coupling of claim 5, wherein the shaft connector provided on the trunnion is a splined opening formed in the trunnion.

8. The coupling of claim 5, further comprising a cylindrical sleeve bearing surrounding each of the cylindrical stubs and supporting the stubs for pivoting within the cylindrical bore formed in the slider blocks.

9. The coupling of claim 5, wherein the planar faces of the axial grooves further comprise a lining of plastic material having a low coefficient of friction.

10. A coupling for connecting a first shaft to a second shaft for pivoting about transverse axes and plunging relative to one another, the coupling comprising:

a drive canister having first and second axial ends, a first shaft connector formed at the first end of the drive canister for connecting the drive canister to the first shaft, a plurality of axial grooves extending axially inward from the second end of the drive canister, the axial grooves each having opposed planar faces;

a shaft support assembly, the shaft support assembly including: a plurality of slider blocks, each slider block being slidable within the axial grooves, each of the slider blocks having opposed planar side faces adapted to slide along the opposed axial faces of the axial grooves; a trunnion support member mounted in the slider blocks for pivoting about a first axis; and a trunnion mounted in the trunnion support member for pivoting about an axis which is transverse to the first axis, the trunnion including a second shaft connector for connecting the trunnion to the second shaft; wherein the second shaft connector is a splined opening formed in the trunnion.

11. The coupling of claim 10, wherein the trunnion includes sleeve bearings formed of a low friction plastic material, so as to support the trunnion for pivoting about an axis transverse to the first axis.

12. The coupling of claim 10, wherein the first shaft connector is a splined stub shaft.

13. The coupling of claim 10, wherein the planar faces of the axial grooves include linings formed of a low friction plastic material.

14. The coupling of claim 10, wherein the trunnion support member is mounted on sleeve bearings in the slider blocks for pivoting about the first axis, the sleeve bearings being formed of plastic.

15. The coupling of claim 10, wherein each slider block comprises a block having a bore formed therein and a non-cylindrical outer periphery which includes opposed planar surfaces, each slider block being mounted on the trunnion support member such that the trunnion support member is pivotable with respect to the slider blocks about the first axis.

16. The coupling of claim 15, wherein the slider blocks are slidably received in the axial grooves of the drive canister for sliding of one of the planar faces of the slider block against one of the planar faces of the axial grooves, the slider blocks being locked against rotation in these grooves by the contact of the planar face of the slider blocks with the planar face of the grooves.

17. A coupling for connecting a first shaft to a second shaft, the coupling comprising:

a drive canister having two axial ends, a shaft connector formed at one end of the drive canister for connecting the drive canister to the first shaft, at least four axial grooves extending axially inward from the second end of the drive canister, the axial grooves each having opposed planar faces;

a shaft support assembly mounted within the drive canister, the shaft support assembly including means for supporting the second shaft for pivoting about two transverse axes and sliding in the direction of the axial grooves, said means including a connector for connecting the second shaft to the shaft support assembly and a plurality of slider blocks, each slider block being slidable within an axial groove, the slider blocks each having opposed planar side faces adapted to slide along the opposed axial faces of the axial groove in which it slides and wherein the means for supporting the second shaft for pivoting about two transverse axes and sliding in the direction of the axial grooves further includes a trunnion support member mounted in the slider blocks for pivoting about a first axis; and a trunnion mounted in the trunnion support member for pivoting about an axis that is transverse to the first axis, the trunnion including a splined opening that serves as the second shaft connector for connecting the shaft support assembly to the other one of the two shafts.

18. The coupling of claim 17, wherein:

the planar faces of the axial grooves include linings formed of a low friction plastic material;

the trunnion support member is mounted on sleeve bearings in the slider blocks;

the trunnion includes sleeve bearings formed of a low friction plastic material; and each slider block comprises a block having a bore formed therein and a non-cylindrical outer periphery which includes opposed planar surfaces, each slider block being mounted on the trunnion support member such that the trunnion support member is pivotable with respect to the slider blocks about the first axis, the slider blocks being slidably received in the axial grooves of the drive canister for sliding of one of the planar faces of the slider block against one of the planar faces of the axial grooves, the slider blocks being locked against rotation in these grooves by the contact of the planar face of the slider blocks with the planar face of the grooves.

* * * * *

UNITED STATES PATENT AND TRADEMARK OFFICE
CERTIFICATE OF CORRECTION

PATENT NO. : 5,417,612
DATED      : May 23, 1995
INVENTOR(S): Russell D. Ide

It is certified that error appears in the above-indentified patent and that said Letters Patent is hereby corrected as shown below:

On the title page, item [54] and column 1, lines 2-3, the title should read as follows:

SHAFT COUPLING WHICH PERMITS BOTH PIVOTING AND PLUNGING

Signed and Sealed this

Twenty-sixth Day of September, 1995

Attest:

BRUCE LEHMAN

*Attesting Officer*     *Commissioner of Patents and Trademarks*